(12) United States Patent
Okuno

(10) Patent No.: US 11,553,120 B2
(45) Date of Patent: Jan. 10, 2023

(54) OPTICAL ELEMENT, OPTICAL SYSTEM, AND IMAGE PICKUP APPARATUS

(71) Applicant: CANON KABUSHIKI KAISHA, Tokyo (JP)

(72) Inventor: Takeharu Okuno, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1044 days.

(21) Appl. No.: 16/156,259

(22) Filed: Oct. 10, 2018

(65) Prior Publication Data

US 2019/0116300 A1 Apr. 18, 2019

(30) Foreign Application Priority Data

Oct. 12, 2017 (JP) .............................. JP2017-198157

(51) Int. Cl.
*H04N 5/225* (2006.01)
*G02B 1/11* (2015.01)
*G02B 1/111* (2015.01)
*G02B 15/14* (2006.01)
*G02B 15/173* (2006.01)
*G02B 27/09* (2006.01)
*G02B 3/00* (2006.01)

(52) U.S. Cl.
CPC .............. *H04N 5/2254* (2013.01); *G02B 1/11* (2013.01); *G02B 1/111* (2013.01); *G02B 15/144113* (2019.08); *G02B 15/173* (2013.01); *G02B 27/0955* (2013.01); *H04N 5/2253* (2013.01)

(58) Field of Classification Search
None
See application file for complete search history.

(56) References Cited

U.S. PATENT DOCUMENTS

2017/0068287 A1   3/2017   Jung et al.

FOREIGN PATENT DOCUMENTS

| CN | 1776460 A   | 5/2006  |
| CN | 102186668 A | 9/2011  |
| CN | 102472842 A | 5/2012  |
| JP | H05281401 A | 10/1993 |
| JP | H07104102 A | 4/1995  |
| JP | H07301703 A | 11/1995 |
| JP | H0836101 A  | 2/1996  |

(Continued)

OTHER PUBLICATIONS

Machine translation of JP 2014-228728A (Year: 2014).*

(Continued)

*Primary Examiner* — Ramsey Zacharia
(74) *Attorney, Agent, or Firm* — Carter, DeLuca & Farrell LLP

(57) ABSTRACT

An optical element includes a plurality of substrates, an adhesive configured to adhere the plurality of substrates to each other, and an antireflection film provided to at least one of an incident surface and an exit surface of the optical element. The antireflection film includes a first layer including alcohol having at least one of an ether bond and an ester bond in a branched structure with 4 to 7 carbon atoms. A content of the alcohol in the first layer is 0.5 mg/cm³ to 5.0 mg/cm³. The first layer has a refractive index of 1.1 to 1.3 for light with a wavelength of 550 nm.

16 Claims, 10 Drawing Sheets

(56) References Cited

FOREIGN PATENT DOCUMENTS

| | | |
|---|---|---|
| JP | H08136703 A | 5/1996 |
| JP | H08201601 A | 8/1996 |
| JP | H1171458 A | 3/1999 |
| JP | 2001188104 A | 7/2001 |
| JP | 2003140037 A | 5/2003 |
| JP | 2004191741 A | 7/2004 |
| JP | 2005300576 A | 10/2005 |
| JP | 2009008901 A | 1/2009 |
| JP | 2010217699 A | 9/2010 |
| JP | 2011002563 A | 1/2011 |
| JP | 2012002888 A | 1/2012 |
| JP | 2012078597 A | 4/2012 |
| JP | 2012108320 A | 6/2012 |
| JP | 2014228728 A | 12/2014 |
| JP | 2015108642 A | 6/2015 |
| JP | 2016109999 A | 6/2016 |
| JP | 2017062479 A | 3/2017 |
| JP | 2017167271 A | 9/2017 |
| KR | 10-2009-0114516 A | 11/2009 |

OTHER PUBLICATIONS

Notice of Reasons for Rejection issued by the Japan Patent Office dated Dec. 7, 2021 in corresponding JP Patent Application No. 2017-198157, with English translation.
Chinese Office Action dated Sep. 2, 2020, for Corresponding Chinese Application No. 201811190764.6.

\* cited by examiner

OPTICAL ELEMENT, OPTICAL SYSTEM, AND IMAGE PICKUP APPARATUS

BACKGROUND OF THE INVENTION

Field of the Invention

The present invention relates to an optical element, an optical system, and an image pickup apparatus (or imaging apparatus), each having an antireflection film.

Description of the Related Art

A surface of a conventional optical element for an optical system, such as a camera lens, has an antireflection film for suppressing unnecessary light, such as flares and ghosts, due to the light quantity loss reduction and reflection of the incident light. Japanese Patent Laid-Open No. ("JP") 2012-078597 discloses an antireflection film having a low refractive index layer with a nano-porous silica film.

The optical system, such as the camera lens, sometimes uses a cemented lens in which a plurality of lenses are adhered to each other by the adhesive. JP 2012-002888 discloses a method for forming an antireflection film on a cemented lens by using a wet process.

In an attempt to form a wet film on the cemented lens using the method disclosed in JP 2012-078597, high-temperature drying and heat treatments after the wet film coating alter or yellow the joining adhesive or cause a transmittance change. In addition, a linear expansion coefficient difference between glass materials of two lenses may peel the adhesive, deform (distort) or crack the lens, or the like.

JP 2012-002888 discloses shapes of the lens and jigs for preventing the coating liquid from dissolving the adhesive on the lens cemented surface in forming a film by a wet method, but is silent about the component of the coating liquid and the post-coating heat treatment.

SUMMARY OF THE INVENTION

The present invention provides an optical element having an antireflection film capable of preventing the adhesive from altering and peeling and of suppressing a degradation of the optical performance.

An optical element according to one aspect of the present invention includes a plurality of substrates, an adhesive configured to adhere the plurality of substrates to each other, and an antireflection film provided to at least one of an incident surface and an exit surface of the optical element. The antireflection film includes a first layer including alcohol having at least one of an ether bond and an ester bond in a branched structure with 4 to 7 carbon atoms. A content of the alcohol in the first layer is 0.5 mg/cm$^3$ to 5.0 mg/cm$^3$. The first layer has a refractive index of 1.1 to 1.3 for light with a wavelength of 550 nm.

Further features of the present invention will become apparent from the following description of exemplary embodiments with reference to the attached drawings.

DESCRIPTION OF THE EMBODIMENTS

Figure 1:
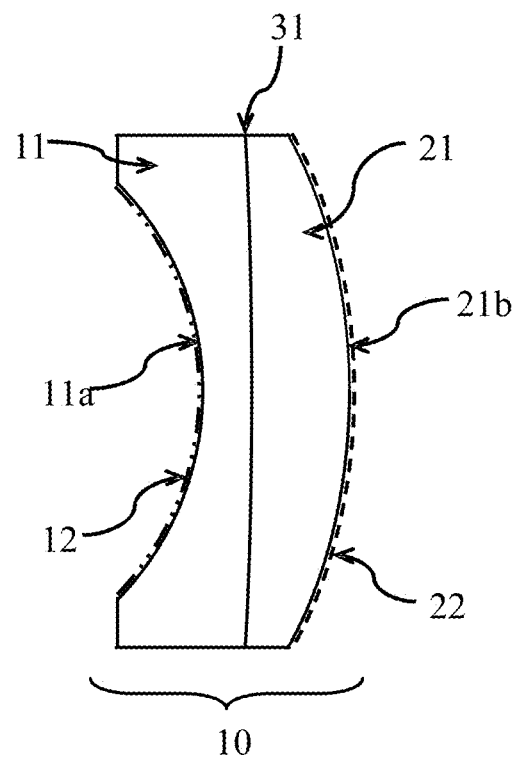
FIG. 1 is a sectional view of a cemented lens as an illustrative optical element according to one embodiment of the present invention.

Referring now to the accompanying drawings, a description will be given of embodiments of the present invention. In each figure, corresponding elements will be designated by the same reference numerals, and a duplicate description thereof will be omitted.

FIG. 1 is a sectional view of a cemented lens 10 as an illustrative optical element according to one embodiment of the present invention. The cemented lens 10 is an optical element made by adhering a concave meniscus lens (substrate) 11 and a convex meniscus lens (substrate) 21 to each other by the adhesive on a cemented surface (or adhered surface) 31. The adhesive may be any one of acrylic, epoxy, and polyene polythiol systems. This embodiment forms an ordinary antireflection film 12 made of a dielectric thin film layer on a light incident surface 11*a*, and an antireflection film 22 according to the present invention on a light exit surface 21*b*.

Figure 2:
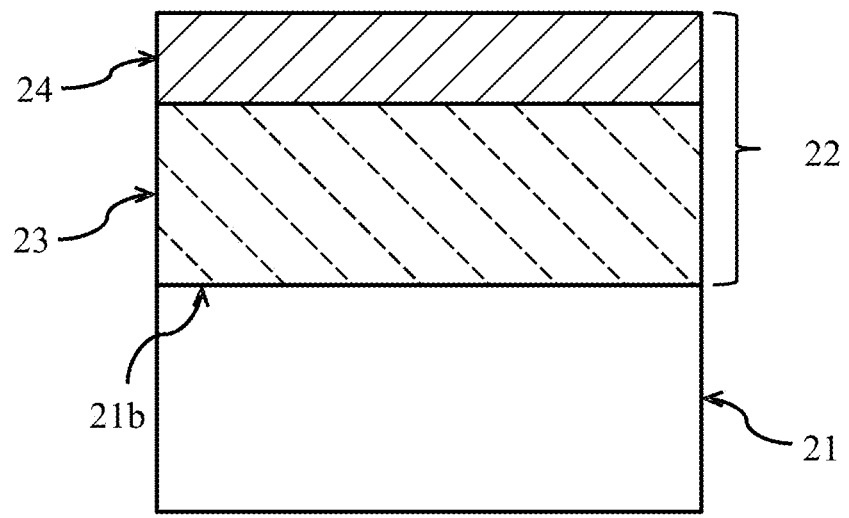
FIG. 2 is a schematic sectional view of an antireflection film.

FIG. 2 is a schematic sectional view of the antireflection film 22. In FIG. 2, the light exit surface 21*b* is shown as a flat surface for simplicity purposes. The antireflection film 22 includes a base layer (or underlayer) 23 that includes a monolayer or multilayer dielectric thin film layer, and a low refractive index layer (first layer) 24 formed on the base layer 23. This embodiment forms the low refractive index layer 24 on the outermost surface of the antireflection film 22.

The base layer 23 includes the monolayer or multilayer dielectric thin film layer according to the refractive index of the convex meniscus lens 21. In the monolayer, the dielectric thin film layer having a refractive index close to the square root of the value made by multiplying the refractive index of the convex meniscus lens 21 to the refractive index of the low refractive index layer 24 may be formed with an optical thickness (physical film thickness×refractive index) as a quarter of a wavelength for which the reflectance particularly needs to be reduced. In the multilayer, the dielectric thin film layer may be formed by appropriately combining the high refractive index layer and the medium refractive index layer with each other. The high refractive index layer may use zirconium oxide, tantalum oxide, niobium oxide, silicon nitride, silicon oxynitride, titanium oxide, cerium oxide, hafnium oxide, etc., singularly or in combination. The medium refractive index layer may properly use aluminum oxide, silicon oxide, silicon oxynitride, magnesium fluoride, and the like. In general, silicon oxide and magnesium fluoride are often treated as a low refractive index layer. Since this embodiment uses the low refractive index layer 24 having a refractive index of 1.1 to 1.3, the medium refractive index layer can also use silicon oxide having a refractive index of about 1.45 and magnesium fluoride having a refractive index of about 1.38.

The base layer 23 is preferably formed by a physical film forming method such as a vacuum deposition method and a sputtering method, but the present invention is not limited the method. For example, the base layer 23 may be formed by a wet method such as a sol-gel method and a chemical vapor deposition method such as a CVD (Chemical Vapor Deposition) method. In utilizing these methods, the base layer 23 needs to be a film that ca be formed at a temperature of 80° C. or lower, 40° C. or lower, or 20° C. to 25° C. so as not to damage the adhesive on the cemented surface. The surface of the base layer 23 has a surface hardness of B or higher, H or higher, of 2H or higher under the pencil hardness test specified in JIS K 5600.

The low refractive index layer 24 contains alcohol having at least one of an ether bond and an ester bond, in a range of 0.5 mg/cm$^3$ to 5.0 mg/cm$^3$ with a branched structure having 4 to 7 carbon atoms, and a refractive index of 1.1 to 1.3 for light having a wavelength of 550 nm. The low refractive index layer 24 contains a porous material having a space filling ratio of 25% to 85%, and its surface has a surface hardness 2B or less under the pencil hardness test prescribed in JIS K 5600. The surface of the low refractive index layer 24 may be water repellent, oil repellent or hydrophilic. For example, a fluorine-containing paint or a silicone paint or the like may be applied with a film thickness of about several nm or less so as not to give an optical influence by vacuum deposition, sputtering, CVD, or the like.

Figure 3:
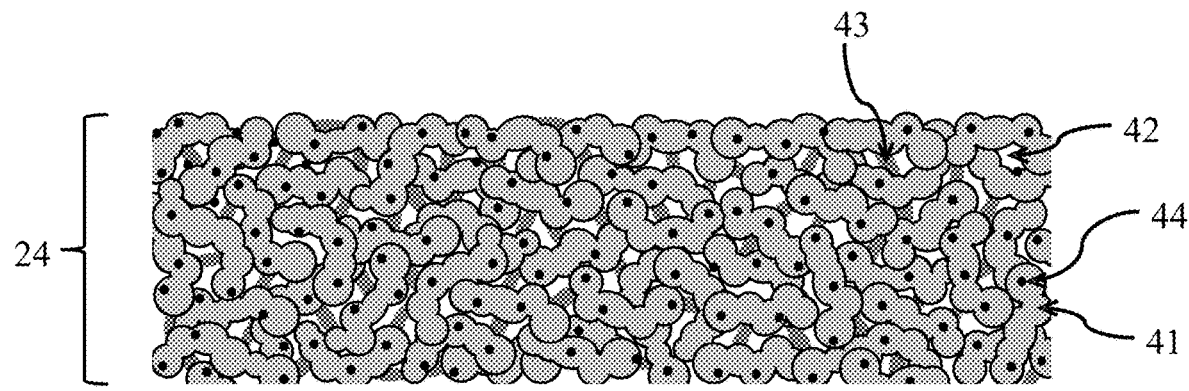
FIG. 3 is a schematic diagram of a low refractive index layer.

Referring now to FIG. 3, a description will be given of a porous material in the low refractive index layer 24. FIG. 3 is a schematic diagram of the low refractive index layer 24. According to this embodiment, the porous material includes secondary particles in which a plurality of (tens of several) secondary particles mainly comprised of silicon oxide particles with an average particle diameter D of 5 nm to 40 nm are coupled to each other, and a binder that contains a siloxane bond. This embodiment uses as chain particles 41 in which a plurality of silica fine particles having an average particle diameter D of 5 nm to 40 nm are linked with each other. Instead of the chain particles, a hollow silica fine particles and magnesium fluoride particles may be used. Using the secondary particles as the chain particles made by linking a plurality of particles in a bent manner can maximize the effects of the present invention and easily manufacture the particles. The average particle diameter is an average Feret's diameter. The average Feret's diameter can be measured by processing a transmission electron micrograph.

Avoid 42 is formed between the chain particle 41 and another chain particle 41, and at least parts of the chain particles 41 are coupled to each other by the binder 43. Alcohol 44 with an ester bond and 4 to 7 carbon atoms in a branched structure located on the surface of the chain particle 41 serves as a spacer between the chain particles 41.

The low refractive index layer 24 contains the voids 42 or air with a refractive index of 1.0, and has a refractive index smaller than that of a film having no void 42. The voids 42 may have a volume ratio of 15% to 75% in the low refractive index layer 24. Thus, the chain particles 41, the binder 43, and the alcohol 44 may be prepared at the space filling rate of 25 to 85%. When the space filling rate is 25% or less, the low refractive index layer 24 has an excessively low refractive index of 1.1 or lower, cannot achieve a good antireflection characteristic, and results in a film having a remarkably low strength and an insufficient environmental viability. When the space filling rate is 85% or higher, the low refractive index layer 24 has a refractive index of 1.3 or higher and cannot realize a good antireflection characteristic. In order to reconcile the refractive index and the strength/environmental viability, the space filling rate may be adjusted to 35% to 75% or 45% to 65%.

In order to form the low refractive index layer 24 on a surface (the light exit surface 21b in this embodiment) of an optical element adhered by the adhesive, the film formation needs to avoid high-temperature heating. This embodiment can obtain a desired void ratio by orienting the alcohol 44 in the chain particles 41 and form the film without high-temperature heating.

In the following description, "alcohol with the ether bond or the ester bond in the branched structure having 4 to 7 carbon atoms" will be referred to as "C4-7 branched alcohol." This embodiment applies dispersion (liquid) that contains the chain particles 41, the binder 43, and the C4-7 branched alcohol 44 on the light exit surface 21b, forms the film thickness of 70 to 280 nm by leaving the dispersion at room temperature (about 20° C. to 25° C.) for about 2 hours, and finishes the low refractive index layer 24. It is determined that the low refractive index layer is "finished" when the low refractive index layer left in a high temperature environment at about 60° C. fluctuates its characteristic only in a practically ignorable range. The "practically ignorable range" means that the thickness and refractive index of the low refractive index film fluctuate within a few percent.

According to this embodiment, the binder 43 has a siloxane bond at a contact part between the chain particles 41 in order to enhance the film strength, and bonds the chain particles 41 with each other. The binder 43 can be used by mixing a solution that contains a component necessary to form the binder 43 composed of a silane alkoxy hydrolysis condensate with a solution in which the chain particles 41 are dispersed in a solvent. Alternatively, the solution in which solid particles linked with each other in a chain shape are dispersed in a solvent may be applied, and the solution containing a component necessary to form the binder 43 may be applied after the particles are arranged.

Figure 4:
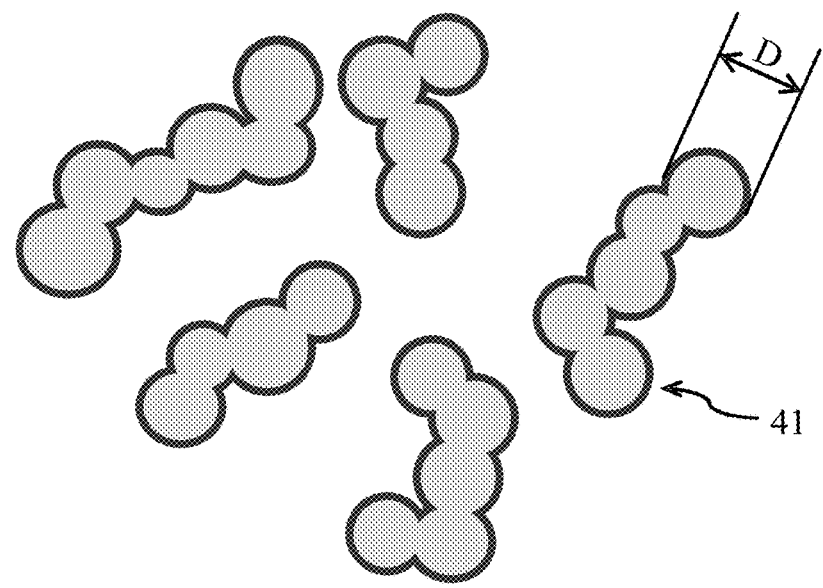
FIG. 4 is a schematic diagram of chain particles.

This embodiment uses the C4-7 branched alcohol 44 as a solvent. Thereby, the steric hindrance caused by the branched structure of the C4-7 branched alcohol 44 can restrain the solvent from depositing to a hydroxyl group on the particle surface, and can keep part of the hydroxyl group on the particle surface. The C4-7 branched alcohol 44 becomes a spacer, and serves to widen the void 42 between the chain particles 41. The chain particle 41 has, as illustrated in FIG. 4, a structure in which a plurality of silica particles are bent and linked with each other. The presence of the C4-7 branched alcohol 44 near the contact between the silica fine particles can provide the effect of widening the void 42.

In order to lower a refractive index or to increase a volume ratio of the void 42 in the low refractive index layer 24, the chain length of the C4-7 branched alcohol 44 serving as the spacer may be longer. However, as the chain length becomes longer, the boiling point of the solvent rises and high-temperature heating is required to vaporize the solvent that is not coordinated with the particles. On the other hand, as the chain length becomes too short, the ratio of the gaps 42 decreases and the refractive index increases. In forming a film by a wet method such as a spin coating method, partial drying starts before the applied film spreads over the optical element surface and the film cannot be uniformly formed. Hence, alcohol in the branched structure with 4 to 7 carbon atoms or 5 to 6 carbon atoms may be welcome.

The effect of widening the void 42 depends on the structure of an ether bond or an ester bond. Alcohol having at least one of the ether bond or the ester bond enhances the spacer effect due to the hydrogen bond between the unshared electron pair of oxygen contained in the ether bond or ester bond and a hydroxyl group on the particle surface. This configuration can form a low refractive index film having small scattering in the visible light.

The C4-7 branched alcohol 44 contains at least one of 1-propoxy-2-propanol, 1-ethoxy-2-propanol, 2-isopropoxy-ethanol, 3-methoxy-1-butanol, 1-methoxy-2-propanol, 1-butoxy-2-propanol, methyl lactate, and ethyl lactate.

The low refractive index layer 24 may contain the C4-7 branched alcohol 44 in a range of 0.5 mg/cm$^3$ to 5.0 mg/cm$^3$ inclusive or 1.0 mg/cm$^3$ to 2.8 mg/cm$^3$ inclusive. When the amount of the C4-7 branched alcohol 44 is less than 0.5 mg/cm$^3$, the low refractive index layer 24 contracts and the refractive index becomes higher. On the other hand, when the amount of the C4-7 branched alcohol 44 is more than 5.0 mg/cm$^3$, the refractive index cannot be reduced by the solvent itself.

As described above, the present invention can form a low refractive index layer having a refractive index of 1.1 to 1.3 inclusive for light having a wavelength of 550 nm without high-temperature heating. Since the low refractive index layer 24 according to this embodiment is formed by leaving it for about 2 hours under the environment of about 20° C. to 25° C., it may be applied not only to a cemented lens but also to a cemented prism, plastic lens, and film etc. In order to form the low refractive index layer 24 in a short time, the layer may be heated within a noninfluential range on the surface of the optical element.

In order to restrain the adhesive from peeling and the lens from deforming or cracking, the cemented lens made by adhering a first lens and a second lens to each other may satisfy the following condition, where $\alpha_1$ ($\times 10^{-7} K^{-1}$) is a linear expansion coefficient of the material of the first lens, $\alpha_2$ ($\times 10^{-7} K^{-1}$) is a linear expansion coefficient of the material of the second lens, and $\varphi_c$ (mm) is an outer diameter of the cemented surface between the first lens and the second lens.

$$2.0 \times 10^2 \leq \varphi_c \times |\alpha_1 - \alpha_2| \leq 2.0 \times 10^4 \quad (1)$$

The following condition may be satisfied.

$$5.0 \times 10^2 \leq \varphi_c \times |\alpha_1 - \alpha_2| \leq 1.0 \times 10^4 \quad (2)$$

Example 1

Figure 5:
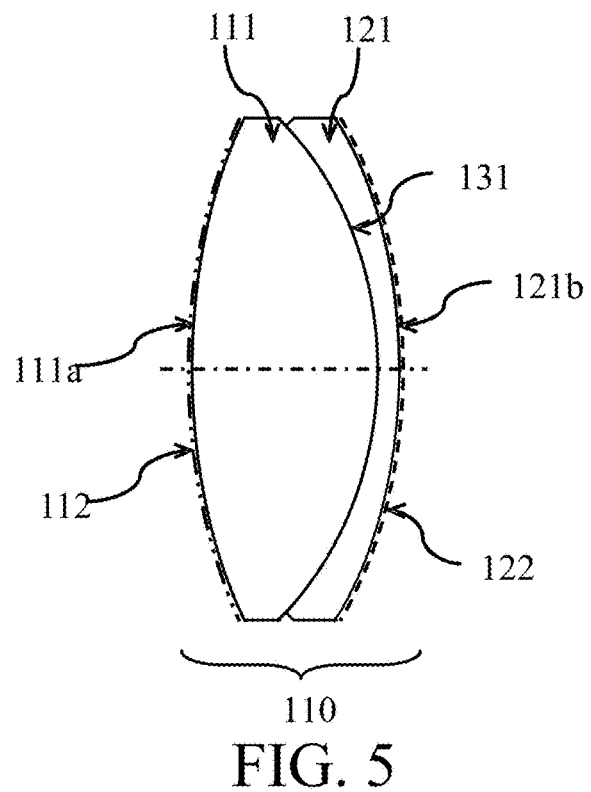
FIG. 5 is a sectional view of a cemented lens according to Example 1.

FIG. 5 is a sectional view of a cemented lens 110 according to this example. The cemented lens 110 is an optical element made by adhering a biconvex lens 111 and a concave meniscus lens 121 to each other by the adhesive on the cemented surface 131. The biconvex lens 111 is made of OHARA Corp. S-FPL51 with a refractive index $n_d$ of 1.497 for the d-line (wavelength of 587.56 nm). The concave meniscus lens 121 is made of OHARA Corp. S-LAH65V with a refractive index $n_d$ of 1.804 for the d-line. The cemented surface 131 has an outer diameter of 30.0 mm.

This embodiment forms an ordinary antireflection film 112 comprised of a dielectric multilayer film on a light incident surface 111a of the cemented lens 110, and an antireflection film 122 according to the present invention on a light exit surface 121b of the cemented lens 110. Table 1 shows designed values of the antireflection film 122.

A description will now be given of an illustrative manufacturing method of the cemented lens 110. Initially, the optical surfaces (the light incident surfaces and the light exit surfaces) of the biconvex lens 111 and the concave meniscus lens 121 are polished, and the outer circumference part of the lens, which is generally called the edge, is centered.

Next, the antireflection film 112 is formed on the light incident surface 111a of the biconvex lens 111. It is unnecessary to provide a dielectric thin film layer on the light exit surface (the same surface as the cemented surface 131) of the biconvex lens 111. This is because the refractive index of the biconvex lens 111 is close to that of the adhesive used for the adhesion and the reflectance at the interface is sufficiently small.

Next, after an aluminum oxide layer (with a refractive index of 1.65) is formed with a thickness of 83.5 nm on the light incident surface of the concave meniscus lens 121 (the same surface as the cemented surface 131), the base layer in the antireflection film 122 according to the present invention is formed on the light exit surface 121b by the vacuum deposition method. According to this example, the base layer is a dielectric thin film layer including eight alternate layers of aluminum oxide and zirconium oxide, as shown in Table 1. While this example forms the base layer by the vacuum evaporation method, the present invention is not limited to this example and may use a sputtering method or a wet method. In addition, this example uses aluminum oxide and zirconium oxide for the film material, the present invention is not limited to this example.

Next, the biconvex lens 111 and the concave meniscus lens 121 are adhered to each other by the adhesive (polyene-polythiol adhesive OP-1045K manufactured by DENKA Co., Ltd.). More specifically, while the light exit surface 121b of the concave meniscus lens 121 faces downwardly, the adhesive is dropped on the cemented surface 131, the biconvex lens 111 is aligned with and pressed against the proper position, and then the UV light is irradiated and the adhesive is cured. The thickness of the adhesive may be 1 to 100 μm or 3 to 20 μm. This embodiment sets the thickness of the adhesive to about 7 The refractive index of the cured adhesive according to this example is 1.52. While this example uses polyene-polythiol adhesive DENKA Co., Ltd., OP-1045K for the adhesive, the present invention is not limited to this example.

While the adhesive may be dropped by a necessary amount of calculated from the thickness and area and completely spread uniformly on the cemented surface 131, this control is substantially difficult. It is thus necessary to drop the adhesive by a larger amount than the necessary amount and to remove an excess amount of the adhesive that projects from the outer circumference part (edge) of the cemented surface 131. A general removal method is to wipe it off with nonwoven fabric or paper cloth (wiper) impregnated with an organic solvent before or after curing. When a porous soft film is formed on the outermost surface of the antireflection film 122 (with the surface hardness of pencil hardness of 2B or less), the wiping contact or the solvent adhesion fluctuates the reflectance characteristic or causes scratches and contaminations. In this embodiment, the outermost surface of the antireflection film 122 in the adhesion step is the outermost surface of the base layer. Hence, the outermost surface of the base layer has a surface hardness of a pencil hardness of B or higher, H or higher, or 2H or higher. According to this embodiment, the outermost surface of the base layer is a zirconium oxide layer having a pencil hardness of 2H or higher, and never causes scratches or poor appearance due to wiping or washing.

After the adhesion step is completed, the low refractive index layer is formed on the base layer. A description will now be given of the dispersion that contains the chain particles used for the low refractive index layer according to this example.

This example used an IPA dispersion of the chain particles (manufactured by Nissan Chemical Industries, Co., Ltd., IPA-ST-UP (registered trademark); solid content of 15 wt %) to prepare the dispersion. The 1-propoxy-2-propanol dispersion (solid concentration 17 wt %) of the chain particles is prepared with an evaporator by replacing the solvent of 2-propanol in the IPA dispersion with 1-propoxy-2-propanol (manufactured by Sigma). A catalyst ratio is 2-propanol:1-propoxy-2-propanol=7.5:92.5.

A binder solution was prepared by adding 18.5 g of tetraethylorthosilicate (also referred to as TEOS or ethyl silicate manufactured by Tokyo Chemical Industry Co., Ltd.) and 16.0 g of 0.1 wt % phosphinic acid as catalyst water corresponding to ten equivalents to TEOS, and by agitating the mixture solution at 20° C. for 60 minutes. A binder solution was added by 32.8 g which corresponds to 0.5 wt % when a component necessary to form the binder with 1-propoxy-2-propanol dispersion of 251.3 g of the chain particles was converted into oxide. Thereafter, 174.5 g of 1-propoxy-2-propanol and 546.5 g of ethyl lactate were added to adjust the solid content of the chain particles to 4.3 wt % when converted into oxide, and the mixture was agitated for 60 minutes to obtain 1-propoxy-2-propanol: ethyl lactate=40:60.

Next, the cemented lens 110 was is installed in a spin coater while its light exit surface 121*b* faced upwardly, the dispersion was dropped by 0.2 ml for spin-coating for 20 seconds at 4000 rpm. Thereafter, the product is left for 2 hours in a clean room atmosphere at room temperature of 23° C. and the cemented lens 110 was finished.

The glass material of the biconvex lens 111 has a linear expansion coefficient $\alpha_1$ of 131 [$\times 10^{-7} K^{-1}$], and the glass material of the concave meniscus lens 121 has a linear expansion coefficient $\alpha_2$ of 60 [$\times 10^{-7} K^{-1}$]. While the cemented lens 110 has a large linear expansion coefficient difference, forming a low refractive index layer without a heat treatment can prevent the adhesive from peeling, the lens from cracking, or the lens surface accuracy from degrading due to the stress, providing a good antireflection performance.

The inventors have recognized by experience that the linear expansion coefficient difference of 30 [$\times 10^{-7} K^{-1}$] or higher causes a problem such as the peel and crack due to the treatment at 80° C. The linear expansion coefficient difference of 60 [$\times 10^{-7} K^{-1}$] or higher causes a problem, such as a surface accuracy degradation at a temperature of about 40° C. Of course, although the problematic degree depends on a shape such as the outer diameter and the thickness of the lens, the fragileness of the glass material, etc., the above value is a rough estimate.

Figure 6:
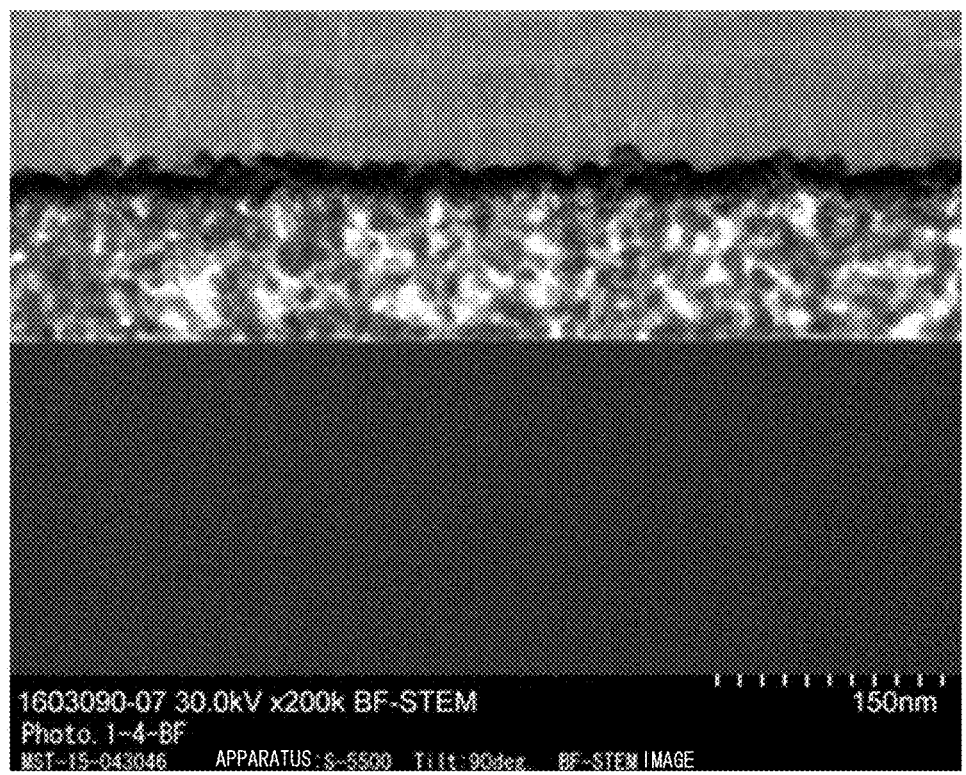
FIG. 6 is an electron micrograph of a low refractive index layer according to Example 1.

A description will now be given of an evaluation result of an optical element having an antireflection film formed on a silicon substrate. The low refractive index layer is formed on the outermost surface of the antireflection film using the dispersion. FIG. 6 illustrates a scanning transmission electron micrograph of the low refractive index layer. In FIG. 6, the treatment for protecting the structure from the electron beam irradiation makes black the surface of the low refractive index layer. The void (white part in FIG. 6) is formed between the bent and linked chain particles. The low refractive index layer had a refractive index of 1.238 according to an evaluation of the low refractive index layer with a spectroscopic ellipsometer (J. A. Woollam Co.).

Silica or silicon oxide generally has a refractive index of about 1.45. Since the particles and the binder are also substantially made of silicon oxide, the space filling rate of the low refractive index layer is about 55.1%. The low refractive index layer had a surface hardness of 2B or lower.

A solvent residue amount and a binder amount in the low refractive index layer were measured by using a column, such as Thermo Scientific headspace TRIPLUS300, Mass spectrograph LSQ LT, gas chromatography TRAC GC ULTRA, Frontier Laboratories Ultra Alloy Series (Model: UA +−5). According to the measurement condition. an oven had a heat temperature of 160° C. in the headspace, an equilibration time was 30 minutes, a purge time was 3 minutes, an ion source in the mass spectrograph had a temperature of 220° C., and an injection port in a gas chromatography had a heat temperature of 200° C. The oven heating condition was as follows: the initial temperature of 40° C. kept for 1 minute, a temperature rise up to 200° C. at a rate of 5.0° C./min, the temperature of 200° C. kept for 10 minutes, a temperature rise up to 320° at a rate of 20.0° C./min, and the temperature of 320° C. kept for 5 minutes.

The substrate prepared in a 10 ml sample tube was set to the internal standard and sealed and measured with a chloroform solution to which naphthalene was added by 0.15 wt %. The solvent residue amount in the low refractive index layer per 1 $cm^3$ was calculated based on the film thickness on the optical element on which the antireflection film was formed and the area of the silicon substrate.

In calculating the solvent residue amount, a calibration curve of the solvent was prepared by adding, by 0.13 wt %, 0.23 wt %, 0.35 wt %, and 0.62 wt %, the solvent to be detected to the chloroform solution to which naphthalene was added by 0.15 wt %.

In calculating the binder amount, a calibration curve of the pentamer of the ethyl silicate hydrolysis condensate was prepared by adding the pentamer of the ethyl silicate hydrolysis condensate, by 0.06 wt %, 0.15 wt %, 0.27 wt, and 0.40 wt %, to the chloroform solution to which naphthalene was added by 0.15 wt %. Peak areas from the tetramer to the octamer of the ethyl silicate hydrolysis condensate obtained by GC-MS were summed and the binder amount was evaluated as the pentamer of the ethyl silicate hydrolysis condensate. The pentamer of the pentamer of the ethyl silicate hydrolysis condensate used ethyl silicate 40 (manufactured by Colcoat Co., Ltd.).

The evaluation results showed that the solvent residue amount in the low refractive index layer was 2.4 mg/$cm^3$ and the binder amount was 0.5 wt %.

The dispersion may be prepared with a content (solvent residue amount) of 0.5 mg/$cm^3$ to 5.0 mg/$cm^3$ of alcohol having at least one of an ether bond or an ester bond in a branched structure with 4 to 7 carbon atoms in the low refractive index layer. This configuration can provide a low refractive index layer having a refractive index of 1.1 to 1.3 inclusive for light having a wavelength of 550 nm without a high-temperature treatment. A low refractive index layer having a refractive index of 1.20 to 1.26 for light having a wavelength 550 nm in which the high antireflection performance and the environmental reliability are reconciled can be formed by preparing the dispersion with the content of 1.0 mg/cm$^3$ to 2.8 mg/cm$^3$.

Figure 7B:
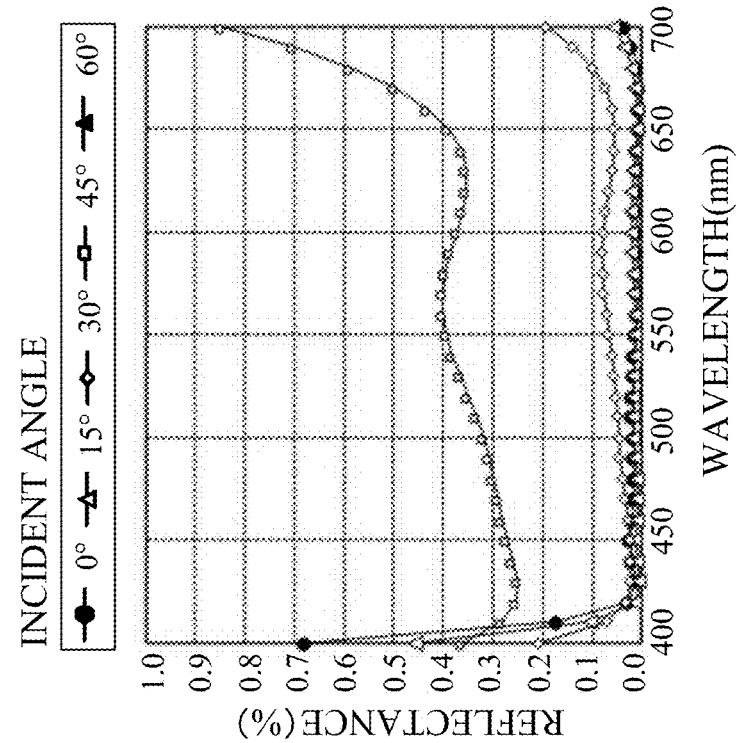
FIGS. 7A and 7B are graphs illustrating reflectance characteristics of an antireflection film according to Example 1.
Figure 7A:
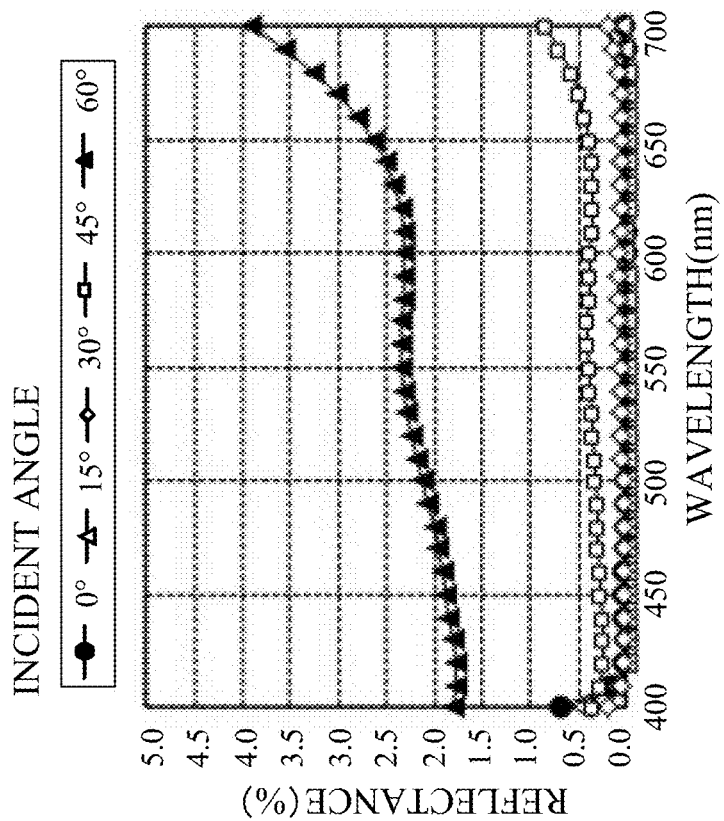

FIGS. 7A and 7B illustrate spectral reflectance characteristics of the antireflection film 122 where the abscissa axis represents a wavelength and the ordinate axis represents the reflectance. In FIG. 7A, the full scale is 5% in the ordinate axis. In FIG. 7B, the full scale is 1% in the ordinate axis. As illustrated in FIGS. 7A and 7B, the antireflection film 122 has such a high antireflection performance for a wavelength of 430 to 670 nm to which an image pickup element, such as the CCD and CMOS, generally used for a digital camera is substantially sensitive. More specifically, the antireflection film 122 has a high antireflection performance of about 0.1% or less for a beam with an incident angle from 0° to 30° and about 0.5% or less for a beam with an incident angle of 45°. Therefore, an optical system, such as a camera lens, including the cemented lens 110 has a high quality such that it can suppress unnecessary light, such as flares and ghosts.

TABLE 1

| No. | n (550 nm) | d (nm) | note |
|---|---|---|---|
| 9 | 1.238 | 115.6 | low refractive index layer |
| 8 | 2.038 | 20.1 | underlayer |
| 7 | 1.651 | 39.1 | |
| 6 | 2.038 | 74.4 | |
| 5 | 1.651 | 30.6 | |
| 4 | 2.038 | 17.8 | |
| 3 | 1.651 | 108.0 | |
| 2 | 2.038 | 9.2 | |
| 1 | 1.651 | 32.2 | |
| substrate | 1.808 | — | S-LAH65V |

Example 2

Figure 8:
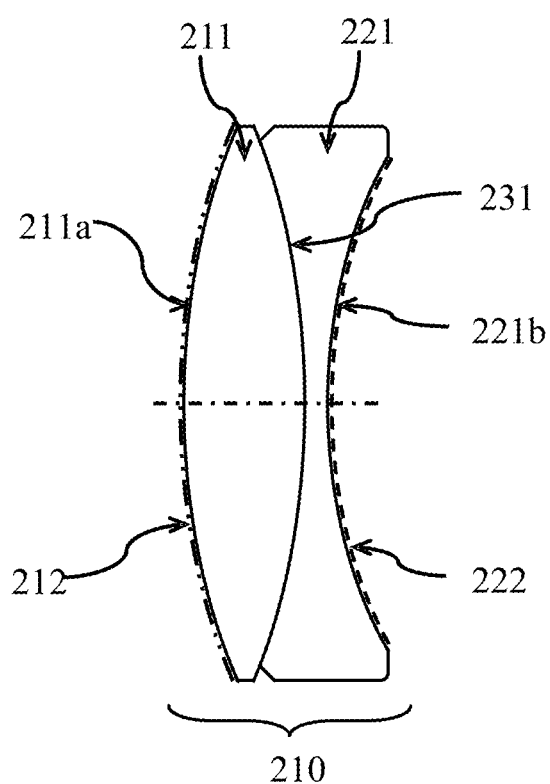
FIG. 8 is a sectional view of a cemented lens according to Example 2.

FIG. 8 is a sectional view of a cemented lens 210 according to this example. The cemented lens 210 is an optical element made by adhering a biconvex lens 211 and a biconcave lens 221 to each other by the adhesive on a cemented surface 231. The biconvex lens 211 is made of HOYA Corp. TAFD 30 with a refractive index nd of 1.883 for the d-line. The biconcave lens 212 is made of OHARA Corp. S-TIM8 with a refractive index dn of 1.596 for the d-line. The cemented surface 231 has an outer diameter of 42.8 mm. This embodiment forms an ordinary antireflection film 212 composed of a dielectric multilayer film on a light incident surface 211a of the cemented lens 210, and the antireflection film 222 according to the present invention on a light exit surface 221b of the cemented lens 210. Table 2 shows designed values of the antireflection film 222. The antireflection film 222 includes a base layer formed by a vacuum deposition method, and a low refractive index layer formed on the base layer. In this embodiment, the base layer is a dielectric thin film layer including six alternate layers of aluminum oxide and zirconium oxide, as shown in Table 2.

The cemented lens 210 is manufactured by substantially the same method as that of the cemented lens 110 according to Example 1. A description will now be given of the manufacturing method of the cemented lens 210 according to this example in difference from that of the cemented lens 110 according to Example 1.

This example used polyene-polythiol adhesive DENKA Co., Ltd., OP-1055H for the adhesive. The biconvex lens 211 and the biconcave lens 212 were adhered to each other so that the adhesive has a thickness of 10 the UV light is irradiated onto it, and then an excess adhesive was wiped off. Thereafter, inner surface antireflection paint (light shield paint) Canon Chemicals Co., GT-7II was applied to an outer circumference part (edge) of the lens.

The low refractive index layer in the antireflection film 222 according to this example was formed by substantially the same manner as that in Example 1, but the ratio of the solvent etc. was appropriately adjusted. The glass material of the biconvex lens 211 has a linear expansion coefficient $\alpha_1$ of 66 [$\times 10^{-7} K^{-1}$], and the glass material of the biconcave lens 212 has a linear expansion coefficient $\alpha_2$ of 84 [$\times 10^{-7} K^{-1}$]. A small linear expansion coefficient difference of 18 [$\times 10^{-7} K^{-1}$] serves to cure the inner surface antireflection paint GT-7II applied to the edge, and the low refractive index layer is formed and dried at a temperature of 80° C. by a convection oven for 20 minutes. According to the analysis of the low refractive index layer according to this example formed on the silicon substrate, the solvent residue amount in the low refractive index layer was 1.2 mg/cm$^3$ and the binder amount was 0.7 wt %.

Figure 9B:
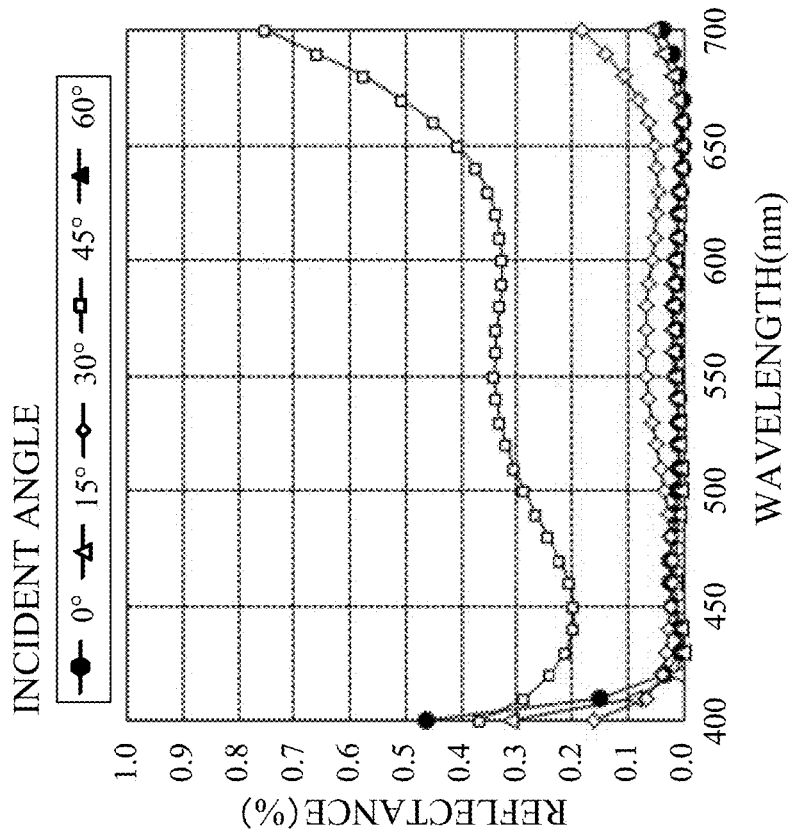
FIGS. 9A and 9B are graphs illustrating reflectance characteristics of an antireflection film according to Example 2.
Figure 9A:
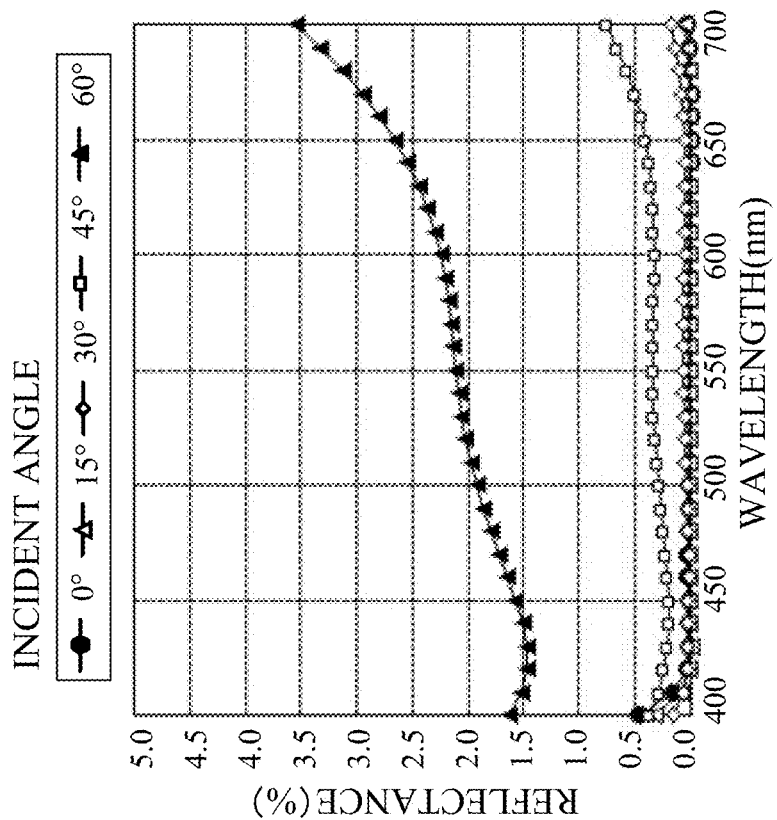

FIGS. 9A and 9B illustrate spectral reflectance characteristics of the antireflection film 222. The antireflection film 222 has a high antireflection function for a wavelength of 430 nm to 670 nm. More specifically, it has a high antireflection performance of about 0.1% or less for a beam with an incident angle from 0° to 30° and about 0.5% or less for a beam with an incident angle of 45°. Therefore, an optical system, such as a camera lens, including the cemented lens 210 has a high quality such that it can suppress unnecessary light, such as flares and ghosts.

TABLE 2

| No. | n (550 nm) | d (nm) | note |
|---|---|---|---|
| 7 | 1.221 | 117.4 | low refractive index layer |
| 6 | 2.038 | 15.4 | underlayer |
| 5 | 1.651 | 47.1 | |
| 4 | 2.038 | 75.1 | |
| 3 | 1.651 | 21.4 | |
| 2 | 2.038 | 22.9 | |
| 1 | 1.651 | 78.0 | |
| substrate | 1.599 | — | S-TIM8 |

Example 3

Figure 10:
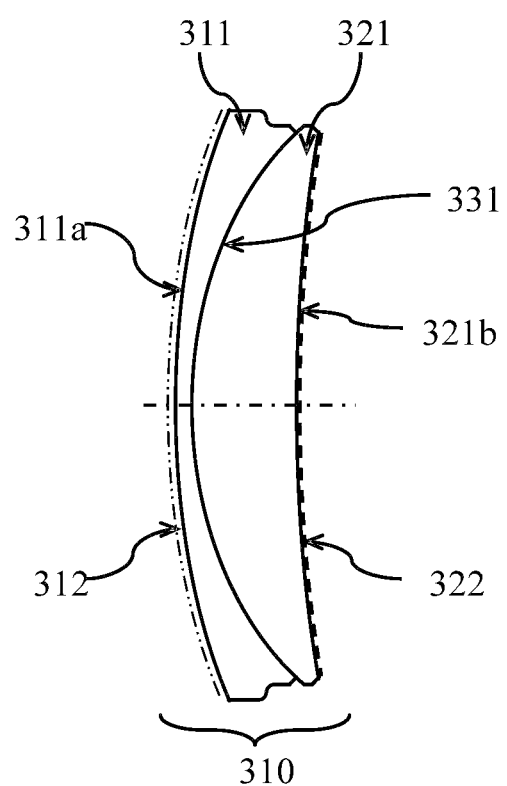
FIG. 10 is a sectional view of a cemented lens according to Example 3.

FIG. 10 is a sectional view of a cemented lens 310 according to this example. The cemented lens 310 is an optical element made by adhering a concave meniscus lens 311 and a convex meniscus lens 321 to each other by the adhesive on a cemented surface 331. The concave meniscus lens 311 is made of OHARA Corp., S-LAH60 with a refractive index nd of 1.834 for the d-line. The convex meniscus lens 321 is made of OHARA Corp., S-FPL53 with a refractive index nd of 1.439 for the d-line. The cemented surface 331 has an outer diameter of 84.0 mm. This embodiment forms an ordinary antireflection film 312 composed of a dielectric multilayer film on a light incident surface 311a of the cemented lens 310, and the antireflection film 322 according to the present invention on a light exit surface 321b of the cemented lens 310. Table 3 shows designed values of the antireflection film 322. The antireflection film 322 includes a base layer formed by a vacuum deposition method, and a low refractive index layer formed on the base layer. In this embodiment, the base layer is a dielectric thin film layer including four alternate layers of aluminum oxide and zirconium oxide as shown in Table 3.

The cemented lens 310 is manufactured by substantially the same method as that of the cemented lens according to Examples 1 and 2. A description will now be given of the manufacturing method of the cemented lens 310 according to this example in difference from that of the cemented lens according to Examples 1 and 2.

This example used as the adhesive Cemedine Co. Ltd., two-component adhesive 1565. The concave meniscus lens 311 and the convex meniscus lens 321 were adhered to each other so that the adhesive has a thickness of 10 μm. Then, an excess adhesive was wiped off, and the adhesive is left at the room temperature of 23° C. and cured. Next, inner surface antireflection paint (light shield paint) Canon Chemicals Co., GT-7II was applied to an outer circumference part (edge) of the lens.

The low refractive index layer in the antireflection film 322 according to this example was formed in substantially the same manner as that in Example 1. The glass material of the concave meniscus lens 311 has a linear expansion coefficient α1 of 56 [×10-7K-1], and the glass material of the convex meniscus lens 321 has a linear expansion coefficient α2 of 145 [×10-7K-1]. Due to a large linear expansion coefficient difference of 89 [×10-7K-1] and a large outer diameter of 84.0 mm of the cemented surface 331, the cemented lens 310 is highly likely to cause the adhesive to peel even at the temperature of about 40° C. and the lens surface accuracy to degrade. However, the low refractive index layer according to the present invention can be cured at the room temperature of 23° C., and a problem, such as a peel and a surface accuracy degradation, occurs.

Figure 11B:
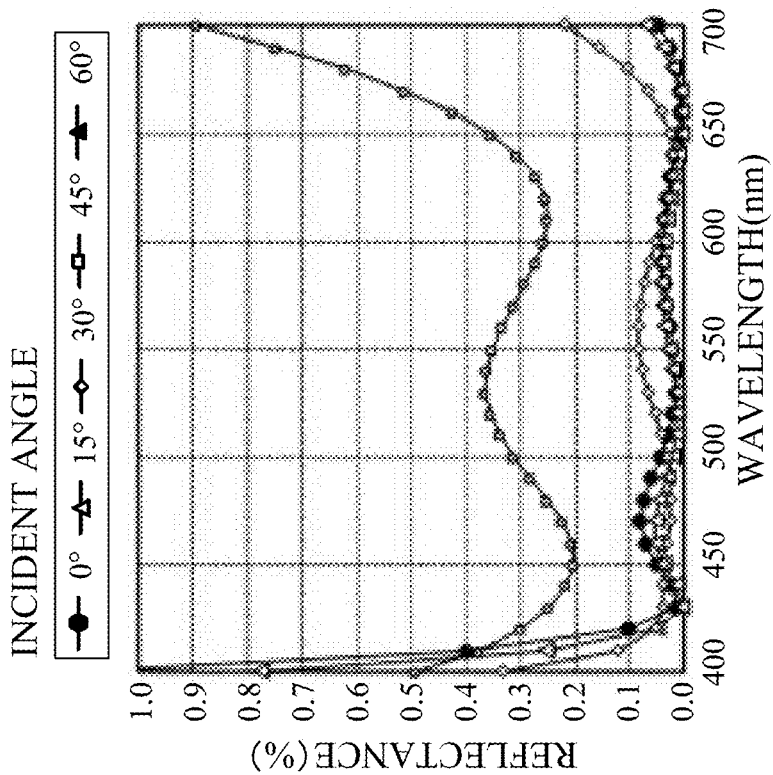
FIGS. 11A and 11B are graphs illustrating reflectance characteristics of an antireflection film according to Example 3.
Figure 11A:
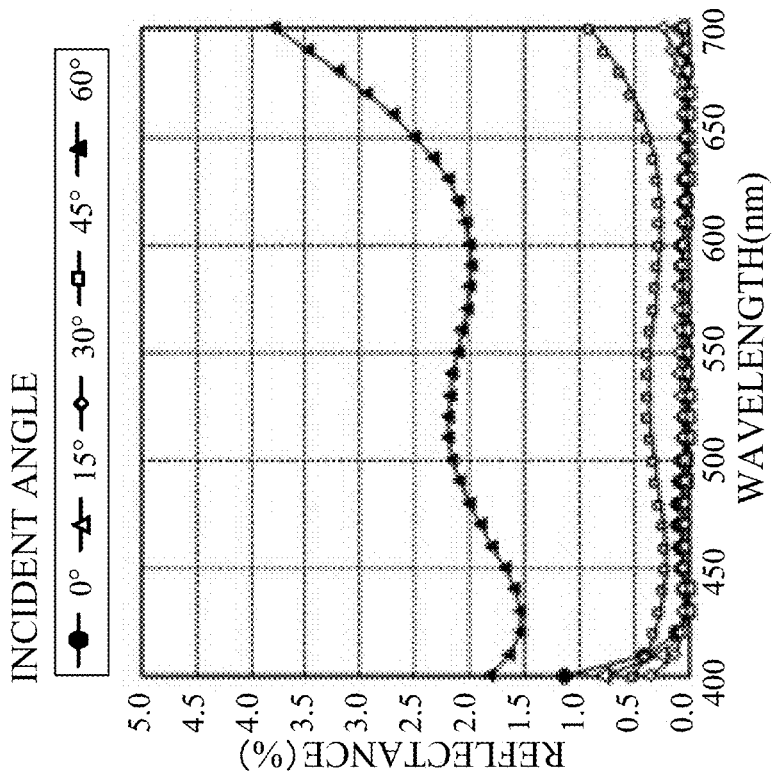

FIGS. 11A and 11B illustrate spectral reflectance characteristics of the antireflection film 322. The antireflection film 322 has a high antireflection function for a wavelength of 430 nm to 670 nm. More specifically, it has a high antireflection performance of about 0.1% or less for a beam with an incident angle from 0° to 30° and about 0.5% or less for a beam with an incident angle of 45°. Therefore, an optical system, such as a camera lens, including the cemented lens 320 has a high quality such that it can suppress unnecessary light, such as flares and ghosts.

TABLE 3

| No. | n (550 nm) | d (nm) | note |
|---|---|---|---|
| 5 | 1.238 | 121.5 | low refractive index layer |
| 4 | 2.038 | 17.1 | underlayer |
| 3 | 1.651 | 58.8 | |
| 2 | 2.038 | 35.5 | |
| 1 | 1.651 | 89.7 | |
| substrate | 1.440 | — | S-FPL53 |

Example 4

Figure 12:
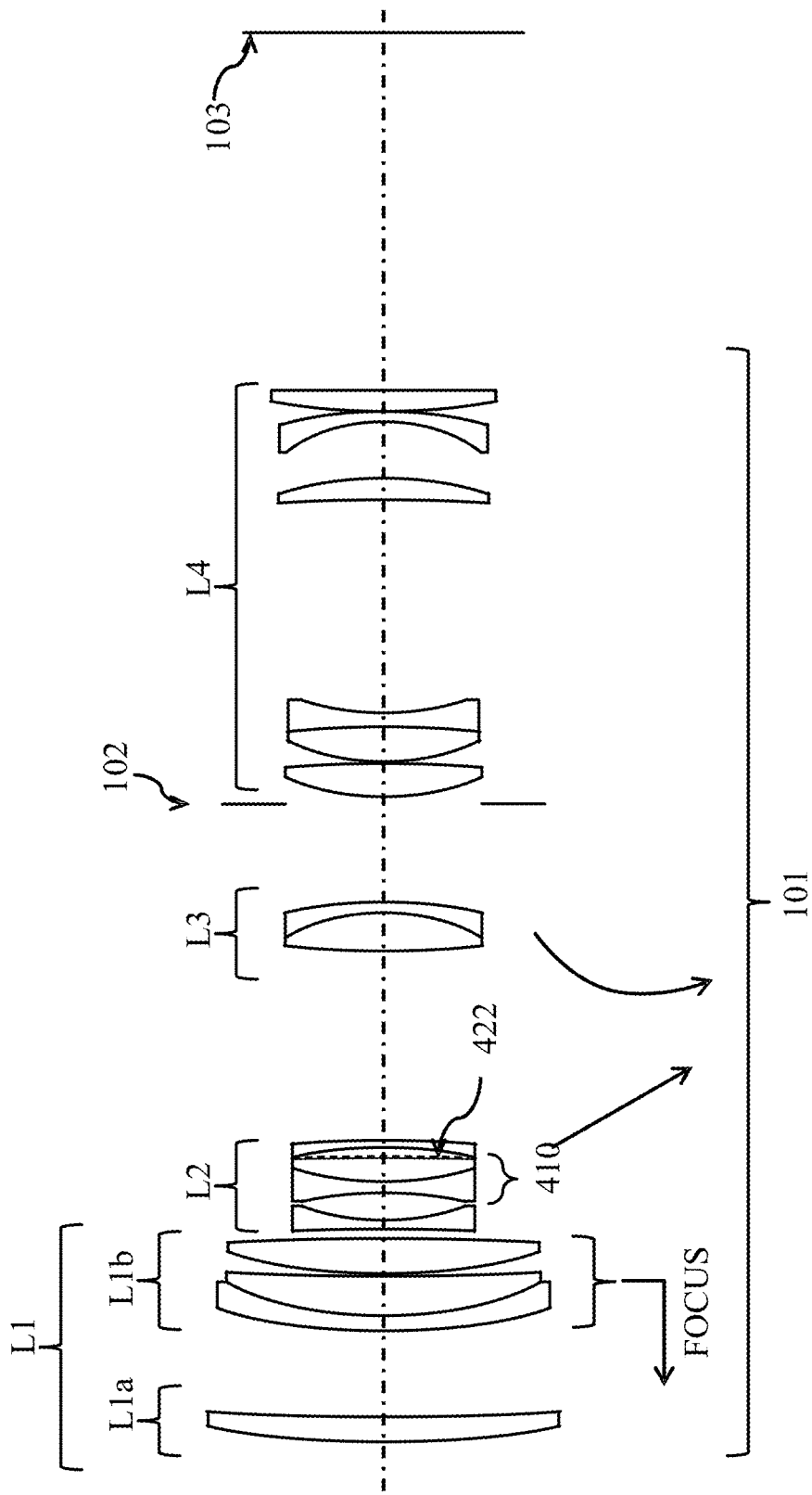
FIG. 12 is a sectional view of an optical system according to Example 4.

FIG. 12 is a sectional view of an optical system 101 according to this example. The optical system 101 according to this embodiment is provided in an image pickup apparatus. The image pickup apparatus includes an image pickup element 103, such as a CCD and a CMOS, which receives an image formed by the optical system 101. The optical system 101 may be held by an unillustrated lens barrel (holder) and the lens barrel may be detachably attached to the image pickup apparatus.

The optical system 101 is a zoom lens that includes, in order from the object side, a first lens unit L1 having a positive refractive power, a second lens unit L2 having a negative refractive power, a third lens unit L3 having a positive refractive power, and a fourth lens unit L4 having a positive refractive power. The optical system 101 includes an aperture stop 102.

In zooming from the wide-angle end to the telephoto end, the second lens unit L2 and the third lens unit L3 move on the optical axis so as to widen a distance between the first lens unit L1 and the second lens unit L2 and to narrow a distance between the second lens unit L2 and the third lens unit L3.

The first lens unit L1 includes a 1a-th lens unit L1a including a single lens with a positive refractive power from the object side, and a 1b-th lens unit L1b having a wholly positive refractive power. In focusing from an infinity object to a close (or short-distance) object, the 1b-th lens unit 1b moves on the optical axis to the object side.

Numerical example 1 shows the designed values according to this example and the lens surface distance or separation in zooming, where (a) shows the designed values of the optical system 101, R is a radius of curvature of the lens, D is a surface distance (lens center thickness), N is a refractive index for the d-line, and ν is an Abbe number.

In the optical system 101 according to this example, the second lens unit L2 significantly moves in zooming and an optical design for restraining the flares and ghosts at all positions is difficult. In particular, in a seventh lens image side surface indicated by a broken line, a radius of curvature is infinite (or plane), and light reflected on the surface of the image pickup element 103 is again reflected and likely to reach the image plane, causing the ghost. Accordingly, this example forms the antireflection film 422 according to the present invention on the seventh lens image side surface.

The seventh lens is adhered to the sixth lens by the adhesive and forms the cemented lens 410. The sixth lens is made of OHARA Corp., S-BSL7 with a refractive index $n_d$ of 1.516 for the d-line. The seventh lens is made of OHARA Corp., S-TIH53W with a refractive index $n_d$ of 1.847 for the d-line. The cemented lens 410 has an outer diameter of 28.4 mm.

This example used DENKA Co., Ltd., polyene-polythiol adhesive OP-1055H for the adhesive as in Example 2. The sixth lens and the seventh lens were adhered to each other so that the adhesive has a thickness of 5 the UV light is irradiated onto it, and then an excess adhesive was wiped off. Next, inner surface antireflection paint (light shield paint) Canon Chemicals Co., GT-7II was applied to the outer circumference part (edge) of the lens. This example forms an ordinary antireflection film made of a dielectric thin film layer on a light incident surface of the cemented lens 410, and the antireflection film 422 according to the present invention on a light exit surface of the cemented lens 410. Table 4 shows designed values of the antireflection film 422. The antireflection film 422 includes a base layer (base layer) formed by a vacuum deposition method, and a low refractive index layer formed on the base layer. In this embodiment, the base layer is a dielectric thin film layer including eight alternate layers of aluminum oxide and zirconium oxide as shown in Table 4.

The low refractive index layer in the antireflection film 422 according to this example was formed by substantially the same manner as that in Example 1, but the ratio of the solvent etc. was appropriately adjusted. The glass material of the sixth lens has a linear expansion coefficient $\alpha_1$ of 72 [$\times 10^{-7}K^{-1}$], and the glass material of the seventh lens has a linear expansion coefficient $\alpha_2$ of 88 [$\times 10^{-7}K^{-1}$]. A small linear expansion coefficient difference of 16 [$\times 10^{-7}K^{-1}$] serves to cure the inner surface antireflection paint GT-7II applied to the edge, the low refractive index layer is formed and dried at a temperature of 40° C. by a convection oven for 60 minutes. According to the analysis of the low refractive index layer according to this example formed on the silicon substrate, the solvent residue amount in the low refractive index layer was 1.8 mg/cm$^3$ and the binder amount was 0.6 wt %.

Figure 13B:
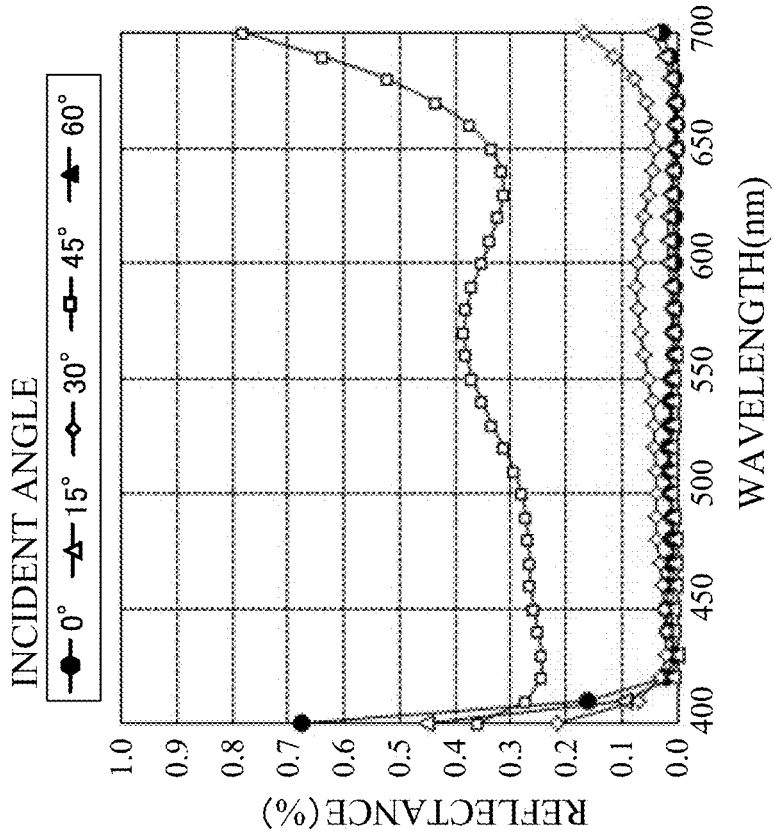
FIGS. 13A and 13B are graphs illustrating reflectance characteristics of an antireflection film according to Example 4.
Figure 13A:
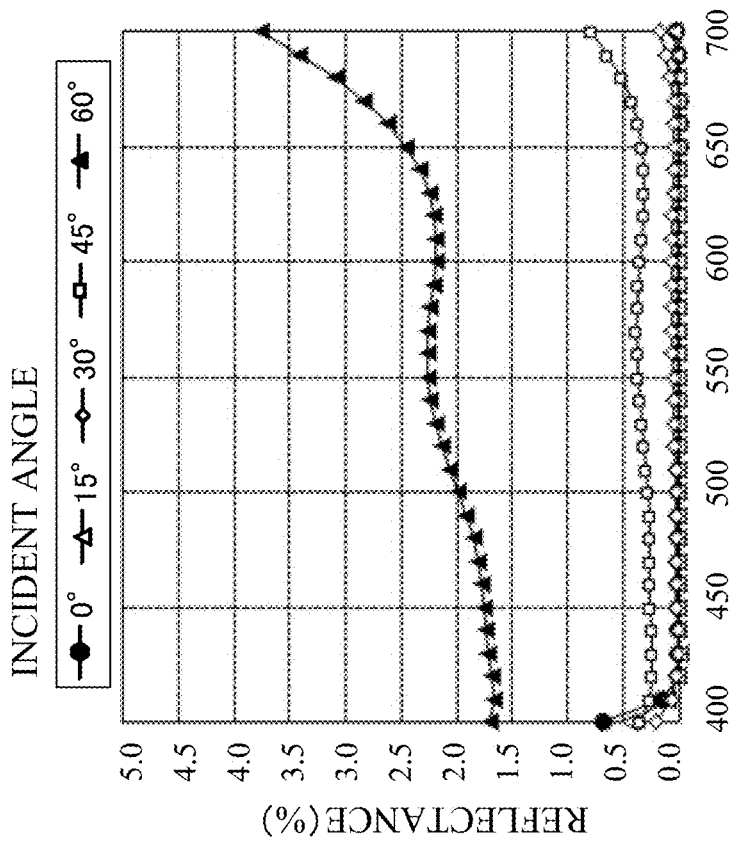

FIGS. 13A and 13B illustrate spectral reflectance characteristics of the antireflection film 422. The antireflection film 422 has a high antireflection function for a wavelength of 430 nm to 670 nm. More specifically, it has a high antireflection performance of about 0.08% or less for a beam with an incident angle from 0° to 30° and about 0.5% or less for a beam with an incident angle of 45°. Therefore, an optical system 101 has a high quality even when a lens that is likely to cause ghosts moves in zooming such that it can suppress unnecessary light, such as flares and ghosts.

TABLE 4

| No. | n (550 nm) | d (nm) | note |
|---|---|---|---|
| 9 | 1.228 | 116.6 | low refractive index layer |
| 8 | 2.038 | 18.6 | underlayer |
| 7 | 1.651 | 41.7 | |
| 6 | 2.038 | 73.6 | |
| 5 | 1.651 | 29.6 | |
| 4 | 2.038 | 17.5 | |
| 3 | 1.651 | 114.7 | |
| 2 | 2.038 | 11.7 | |
| 1 | 1.651 | 29.9 | |
| substrate | 1.854 | — | S-TIH53W |

Numerical Example 1

(a)
f = 72.04~194.61 [mm] Fno. = 4.1~4.1 2ω = 33.4~12.7°

| | | | |
|---|---|---|---|
| R1 = 154.199 | D1 = 3.70 | N1 = 1.487490 | v1 = 70.2 |
| R2 = 439.052 | D2 = 13.58 | | |
| R3 = 101.882 | D3 = 2.10 | N2 = 1.721507 | v2 = 29.2 |
| R4 = 59.950 | D4 = 0.06 | | |
| R5 = 60.744 | D5 = 5.85 | N3 = 1.496999 | v3 = 81.5 |
| R6 = 354.564 | D6 = 0.15 | | |
| R7 = 84.761 | D7 = 5.00 | N4 = 1.496999 | v4 = 81.5 |
| R8 = −1942.711 | D8 = variable | | |
| R9 = −209.243 | D9 = 1.40 | N5 = 1.804000 | v5 = 46.6 |
| R10 = 36.605 | D10 = 4.00 | | |
| R11 = −74.331 | D11 = 1.40 | N6 = 1.516330 | v6 = 64.1 |
| R12 = 37.493 | D12 = 3.90 | N7 = 1.846658 | v7 = 23.9 |
| R13 = ∞ | D13 = 1.42 | | |
| R14 = −63.504 | D14 = 1.40 | N8 = 1.749497 | v8 = 35.3 |
| R15 = −164.753 | D15 = variable | | |
| R16 = 193.017 | D16 = 5.80 | N9 = 1.622992 | v9 = 58.2 |
| R17 = −29.975 | D17 = 1.50 | N10 = 1.762001 | v10 = 40.1 |
| R18 = −67.214 | D18 = variable | | |
| R19 = stop | D19 = 1.20 | | |
| R20 = 38.745 | D20 = 4.80 | N11 = 1.603112 | v11 = 60.6 |
| R21 = −656.147 | D21 = 0.20 | | |
| R22 = 36.505 | D22 = 5.00 | N12 = 1.496999 | v12 = 81.5 |
| R23 = −153.290 | D23 = 1.94 | N13 = 1.806098 | v13 = 40.9 |
| R24 = 36.711 | D24 = 32.60 | | |
| R25 = −771.749 | D25 = 3.50 | N14 = 1.603112 | v14 = 60.6 |
| R26 = −62.378 | D26 = 8.66 | | |
| R27 = −27.517 | D27 = 1.60 | N15 = 1.696797 | v15 = 55.5 |
| R28 = −62.646 | D28 = 0.15 | | |
| R29 = 111.026 | D29 = 3.00 | N16 = 1.592701 | v16 = 35.5 |
| R30 = ∞ | | | |

*radius of curvature (R) and surface distance (D) have unit of mm. Refractive index (N) has value for the d-line with wavelength of 587.56 nm. v is Abbe number.

(b)

| | Focal length | | |
|---|---|---|---|
| Variable distance | 72.04 | 118.41 | 194.61 |
| D8 = | 1.90 | 24.24 | 38.67 |
| D15 = | 28.62 | 19.02 | 1.85 |
| D18 = | 15.40 | 2.65 | 5.39 |

*unit: mm

Table 5 shows the numerical values of the cemented lenses according to Examples 1 to 4.

TABLE 5

| | | FIRST LENS | | | SECOND LENS | | |
|---|---|---|---|---|---|---|---|
| | | GLASS MATERIAL | nd | LINEAR EXPANSION COEFFICIENT $\alpha_1$ $(10^{-7}K^{-1})$ | GLASS MATERIAL | nd | LINEAR EXPANSION COEFFICIENT $\alpha_2$ $(10^{-7}K^{-1})$ |
| EXAMPLE | 1 | S-FPL51 | 1.496 | 131 | S-LAH65V | 1.804 | 60 |
| | 2 | TAFD30 | 1.883 | 66 | S-TIM8 | 1.596 | 84 |
| | 3 | S-LAH60 | 1.834 | 56 | S-FPL53 | 1.439 | 145 |
| | 4 | S-BSL7 | 1.516 | 72 | S-TIH53W | 1.847 | 88 |

| | | LINEAR EXPANSION COEFFICIENT DIFFERENCE $(10^{-7}K^{-1})$ | CEMENTED LENS OUTER DIAMETER φc (mm) | φc × |$\alpha_1 - \alpha_2$| (mm/K) |
|---|---|---|---|---|
| EXAMPLE | 1 | 71 | 30.0 | 2.13E+03 |
| | 2 | 18 | 42.8 | 7.70E+02 |
| | 3 | 89 | 84.0 | 7.48E+03 |
| | 4 | 16 | 28.4 | 4.54E+02 |

Examples 1 to 4 discuss the illustrative cemented lenses made by adhering two lenses to each other, but the present invention is not limited to these examples. The present invention is also applicable to a cemented lens made by adhering three or more lenses to one another. The cemented lenses according to Examples 1 to 4 form the antireflection film according to the present invention on the light exit surface, but may form it on the light incident surface. The optical system according to Example 4 has one cemented lens according to the present invention, but may include a plurality of cemented lenses according to the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-198157, filed on Oct. 12, 2017, which is hereby incorporated by reference herein in its entirety.

What is claimed is:

1. An optical element comprising:
   a plurality of substrates;
   an adhesive configured to adhere the plurality of substrates to each other; and
   an antireflection film provided to at least one of an incident surface and an exit surface of the optical element,
   wherein the antireflection film includes a first layer including alcohol having at least one of an ether bond and an ester bond in a branched structure with 4 to 7 carbon atoms,
   wherein a content of the alcohol in the first layer is 0.5 mg/cm$^3$ to 5.0 mg/cm$^3$, and
   wherein the first layer has a refractive index of 1.1 to 1.3 for light with a wavelength of 550 nm.

2. The optical element according to claim 1, wherein the antireflection film includes a base layer on which the first layer is provided.

3. The optical element according to claim 2, wherein the base layer includes a dielectric thin film layer.

4. The optical element according to claim 1, wherein the first layer is made of a porous material.

5. The optical element according to claim 4, wherein the porous material includes at least one of silicon oxide and magnesium fluoride.

6. The optical element according to claim 4, wherein the porous material includes secondary particles in which a plurality of secondary particles mainly comprised of silicon oxide particles with an average particle diameter of 5 nm to 40 nm are linked with one another, and a binder that has a siloxane bond.

7. The optical element according to claim 1, wherein the alcohol includes at least one of 1-propoxy-2-propanol, 1-ethoxy-2-propanol, 2-isopropoxyethanol, 3-methoxy-1-butanol, 1-methoxy-2-propanol, 1-butoxy-2-propanol, methyl lactate, and ethyl lactate.

8. The optical element according to claim 1, wherein the alcohol includes 1-propoxy-2-propanol and ethyl lactate.

9. The optical element according to claim 1, wherein the content of the alcohol in the first layer is 1.0 mg/cm$^3$ to 2.8 mg/cm$^3$.

10. The optical element according to claim 2, wherein a surface of the base layer has a surface hardness of B or higher under a pencil hardness test specified in JIS K 5600.

11. The optical element according to claim 1, wherein the adhesive is made of any one of acrylic, epoxy, and polyene polythiol systems.

12. The optical element according to claim 2, wherein the base layer includes two or more of zirconium oxide, tantalum oxide, niobium oxide, silicon nitride, silicon oxynitride, titanium oxide, cerium oxide, hafnium oxide, aluminum oxide, silicon oxide, and magnesium fluoride.

13. The optical element according to claim 1, wherein the optical element includes a first lens and the second lens adhered to each other by the adhesive, and the following condition is satisfied:

$$2.0\times10^2 \leq \varphi_c \times |\alpha_1 - \alpha_2| \leq 2.0\times10^4$$

where $\alpha_1$ ($\times 10^{-7}$K$^{-1}$) is a linear expansion coefficient of a material of the first lens, $\alpha_2$ ($\times 10^{-7}$K$^{-1}$) is a linear expansion coefficient of a material of the second lens, and $\varphi_c$ (mm) is an outer diameter of a cemented surface between the first lens and the second lens.

14. The optical element according to claim 13, wherein the following condition is satisfied:

$$5.0\times10^2 \leq \varphi_c \times |\alpha_1 - \alpha_2| \leq 1.0\times10^4.$$

15. An optical system comprising:
   an optical element according to claim 1; and
   a holder configured to hold the optical element.

16. An image pickup apparatus comprising:
   an optical system including an optical element according to claim 1; and
   an image pickup element configured to receive an image formed by the optical system.

* * * * *